United States Patent
Scheider (10) Patent No.: US 10,639,760 B2
(45) Date of Patent: May 5, 2020

(54) APPARATUS FOR MACHINING A WORKPIECE WITH A TOOL HAVING A FLUID FEED APPARATUS, AND A METHOD FOR SETTING UP SUCH AN APPARATUS

(71) Applicant: Klingelnberg AG, Zürich (CH)

(72) Inventor: Burkhard Scheider, Hückeswagen (DE)

(73) Assignee: KLINGELNBERG AG (CH)

( * ) Notice: Subject to any disclaimer, the term of this patent is extended or adjusted under 35 U.S.C. 154(b) by 127 days.

(21) Appl. No.: 15/619,729

(22) Filed: Jun. 12, 2017

(65) Prior Publication Data

US 2017/0355055 A1     Dec. 14, 2017

(30) Foreign Application Priority Data

Jun. 14, 2016   (EP) ..................................... 16174319

(51) Int. Cl.
    *B23Q 11/10*          (2006.01)
    *B24B 53/095*       (2006.01)
    (Continued)

(52) U.S. Cl.
    CPC .......... *B23Q 11/1023* (2013.01); *B23Q 3/157* (2013.01); *B23Q 11/0003* (2013.01);
    (Continued)

(58) Field of Classification Search
    CPC ............ B23Q 11/0003; B23Q 11/1023; B23Q 11/1076; B23Q 11/10; B23Q 3/157; B24B 55/02; B24B 55/03; B24B 53/095
    (Continued)

(56) References Cited

U.S. PATENT DOCUMENTS 3,543,451 A * 12/1970 Smith ................... B24B 55/045
                                                         451/450
6,126,526 A * 10/2000 Herrscher ............... B24B 25/00
                                                         451/259

(Continued)

FOREIGN PATENT DOCUMENTS

DE           29915499 U1    12/1999
DE     102012104263 A1    11/2013
               (Continued)

OTHER PUBLICATIONS

Extended European Search Report for European Patent Application No. EP 16174319.0, dated Dec. 12, 2016, 12 pages.

*Primary Examiner* — Eileen P Morgan
(74) *Attorney, Agent, or Firm* — McCarter & English, LLP (57) ABSTRACT

A method for setting up an apparatus (100) which is formed for machining a workpiece with a tool (20) comprises:
    providing the tool (20) in the region of the apparatus (100),
    providing a line assembly (53) in the region of the apparatus (100), which is fitted with at least one outlet nozzle,
    transferring a first linear axis (A1) of the apparatus (100) to a changing position by moving at least one axis of the apparatus (100),
    receiving the tool (20) by a tool spindle (21) which is carried by the first linear axis (A1), and the line assembly (53) plus the at least one outlet nozzle by a clamping system which is carried directly or indirectly by the first linear axis (A1), or by an additional axis, wherein the receiving of the tool (20) and the receiving of the line assembly (53) occur successively or simultaneously.

15 Claims, 9 Drawing Sheets

(51) Int. Cl.
  *B24B 55/04* (2006.01)
  *B23Q 3/157* (2006.01)
  *B23Q 11/00* (2006.01)
  *B29B 11/14* (2006.01)
  *G05B 19/414* (2006.01)

(52) U.S. Cl.
  CPC .......... *B23Q 11/10* (2013.01); *B23Q 11/1076* (2013.01); *B24B 53/095* (2013.01); *B24B 55/04* (2013.01); *B29B 11/14* (2013.01); *G05B 19/4145* (2013.01)

(58) Field of Classification Search
  USPC .................................................. 451/449, 450
  See application file for complete search history.

(56) References Cited

U.S. PATENT DOCUMENTS

| | | | | |
|---|---|---|---|---|
| 6,454,636 | B1 * | 9/2002 | Iwabuchi | B24B 57/02 451/450 |
| 6,666,748 | B2 * | 12/2003 | Hiramoto | B23Q 3/15773 125/11.03 |
| 7,452,261 | B2 * | 11/2008 | Gretler | B24B 55/02 451/11 |
| 7,931,427 | B1 * | 4/2011 | McArthur | B23Q 11/1084 408/61 |
| 9,242,344 | B2 * | 1/2016 | Graham | B23Q 11/10 |
| 9,393,671 | B2 * | 7/2016 | Webster | B24B 53/005 |
| 9,409,271 | B2 * | 8/2016 | Wolgram | B24B 55/03 |
| 2006/0040584 | A1 * | 2/2006 | Ray | B24B 1/00 451/5 |
| 2008/0145164 | A1 * | 6/2008 | Hackman | B23Q 1/0018 409/135 |
| 2010/0130106 | A1 * | 5/2010 | Hyatt | B24B 5/02 451/53 |
| 2011/0081844 | A1 * | 4/2011 | Dremel | B23F 5/04 451/259 |
| 2011/0182687 | A1 * | 7/2011 | Munz | B23Q 7/045 409/225 |
| 2011/0318123 | A1 * | 12/2011 | Leishman | B23Q 11/10 408/1 R |
| 2014/0273750 | A1 * | 9/2014 | Webster | B24B 53/005 451/5 |
| 2014/0366692 | A1 * | 12/2014 | Schmidt | B23B 25/00 82/152 |
| 2015/0126097 | A1 * | 5/2015 | Li | B05B 5/03 451/450 |
| 2015/0151397 | A1 * | 6/2015 | Wolgram | B24B 55/03 137/798 |
| 2019/0049922 | A1 * | 2/2019 | Schalaster | B23Q 11/1076 |

FOREIGN PATENT DOCUMENTS

| | | |
|---|---|---|
| EP | 0387848 A2 | 9/1990 |
| EP | 2722123 A1 | 4/2014 |
| WO | 2014035789 A1 | 3/2014 |

* cited by examiner

APPARATUS FOR MACHINING A WORKPIECE WITH A TOOL HAVING A FLUID FEED APPARATUS, AND A METHOD FOR SETTING UP SUCH AN APPARATUS

This application claims priority under 35 U.S.C. §§ 119 (a)-(d) to European patent application no. EP16174319.0 filed Jun. 14, 2016 which is hereby expressly incorporated by reference as part of the present disclosure.

FIELD OF INVENTION

The present invention relates to apparatuses which are designed for machining a workpiece with a tool, wherein the apparatus comprises a fluid feed apparatus. The invention also relates to a method for setting up such an apparatus. Gear-cutting machines are concerned in particular.

BACKGROUND

It is known that a cooling agent or lubricant is used during metal-cutting machining. Current machining machines and centres are therefore often fitted with a powerful liquid agent supply. A swan-neck-type head is mostly manually set in such a way that the liquid jet emitted from the head meets the position to be machined. In addition to the pure cooling or lubricating effect, it is also intended to efficiently remove the chips which are produced.

It has been recognised that the setting of such a liquid agent supply is not always optimal. It is therefore possible under certain circumstances that the full effect is not achieved. That is why fluid feed apparatuses which comprise a rigid line assembly that can be fitted with outlet nozzles are increasingly used especially in the automated environment. In order to achieve an optimal cooling or lubricating effect, each tool can be associated with a line arrangement which is respectively equipped with outlet nozzles, in which the fitting with outlet nozzles and the orientation of said outlet nozzles were optimised in a previous step. If a tool is to be changed in the machine in such a constellation, then the fluid feed apparatus is usually also changed.

The change of the fluid feed apparatus occurs in a partly automated manner in modern machines. Manual intervention for example in order to fasten the fluid feed apparatus by means of screws in the machine is still required. The respective expenditure of time is therefore partly relatively high.

It is also been recognised that despite an optimally adjusted fluid feed apparatus the cooling or lubricating effect may not be optimal under certain circumstances. Examinations have shown that the cooling or lubricating effect decreases in efficiency especially when a grinding tool changes its shape as a result of wearing phenomena or when a grinding tool has a changed shape after the dressing.

SUMMARY

It is therefore the object of some of the embodiments of the invention to reduce non-productive times which are incurred for example by manual interventions.

Some embodiments of the invention especially concern the use of a cooling agent or lubricant in liquid form or in gaseous form (generally referred to herein as fluid) in the machining of metal workpieces. Machining of gearwheels by wet metal-cutting is concerned in particular.

The object is achieved in accordance with at least some embodiments of the invention.

Some embodiments of the invention relate to the machining of workpieces/components. Machining by wet metal-cutting is concerned in particular.

A rigid line assembly with fixedly mountable outlet nozzles is used in some embodiments, instead of flexible lines and swan-neck-type pivotable outlet nozzles.

The apparatus of some embodiments of the invention is especially formed for machining a workpiece with a tool and it comprises:
 a tool axis for rotatably driving the tool, and
 a fluid feed apparatus having a line assembly and at least one outlet nozzle, which is formed to emit under pressure a fluid through the at least one outlet nozzle in the direction of the tool, wherein the line assembly is arranged on the apparatus in such a way that together with the at least one outlet nozzle it jointly follows the movements of the tool in order to respectively remain in the relative spatial relationship to the tool.

The fluid feed apparatus of some embodiments of the invention comprises:
 a clamping system which comprises a coupling region and
 is formed for automatically clamping the line assembly to the apparatus and/or the automatic disconnection of the line assembly from the apparatus.

The apparatus of some embodiments of the invention comprises an electromechanical, electromagnetic, hydraulic and/or pneumatic actuating apparatus, which allows automatically disconnecting the line assembly in the coupling region from the apparatus and/or automatically clamping the line assembly in the coupling region to the apparatus. It is an advantage of the aforementioned types of the actuating apparatus that they can be controlled and/or actuated by the (CNC) controller of the apparatus.

The apparatus of some embodiments of the invention comprises a fluid coupling in the coupling region, which is formed after automated clamping to provide a pressure-tight fluid connection between a pressure side of the fluid feed apparatus and the line assembly plus the at least one outlet nozzle. Such a pressure-tight fluid connection allows the automated clamping of the line assembly.

The apparatus of some embodiments of the invention comprises at least one mechanical coupling apparatus in the coupling region, wherein said coupling apparatus comprises a first coupling element on the apparatus side and a second coupling element on the side of the line assembly, and wherein the first coupling element and the second coupling element are formed in a complementary manner in order to engage (in an interlocking and/or force-fitting manner) into each other in the clamped state. The use of at least one such mechanical coupling apparatus offers the advantage that the line assembly can be connected to the apparatus in a mechanically stable and sturdy manner. Furthermore, the use of a mechanical coupling apparatus offers the advantage that no transverse forces are exerted on the fluid coupling in the coupling region.

The apparatus of some embodiments of the invention can be configured in different ways concerning the number of the axes and the constellation of the axes.

The apparatus of some embodiments of the invention can comprise a first linear axis for example, wherein the tool axis is arranged on said first linear axis. Furthermore, the apparatus of some embodiments of the invention can comprise an additional axis which carries the line assembly plus the at least one outlet nozzle in such a way that the line assembly plus the at least one outlet nozzle can be displaced relative to the tool so as to enable fine adjustment, readjustment or compensation for wear and tear. The use of such an additional axis allows readjusting the line assembly in the event of a change in the shape of the tool which is caused by wear and tear for example. Alternatively, the fact can be taken into account after the dressing of a grinding tool that the shape of the grinding tool changes during dressing.

The additional axis can be arranged in some embodiments on the first linear axis of the apparatus. In this case, the additional axis is formed in such a way so as to allow fine adjustment, readjustment or compensation for wear and tear. Otherwise, the line assembly jointly follows the movements of the first linear axis and the tool.

The additional axis can also be arranged on the apparatus in some embodiments separately from the linear axis in such a way however that it allows a movement of the line assembly plus the at least one outlet nozzle independently of a movement of the first linear axis. In this constellation, the additional axis should be coupleable in at least some embodiments to the linear axis in such a way that the additional axis automatically follows all movements of the linear axis. The coupling can occur in a mechanical and/or electronic manner (e.g. by triggering the two axes by the (CNC) controller of the apparatus).

The method of some embodiments of the invention has especially been developed for fitting (setting up) an apparatus which is formed for machining a workpiece with a tool. This method of some embodiments of the invention comprises the following steps:

providing the tool in the region of the apparatus, providing a line assembly in the region of the apparatus, which is fitted with at least one outlet nozzle, transferring a first linear axis of the apparatus to a changing position by moving at least one axis of the apparatus, receiving the tool by a tool spindle which is carried by the first linear axis and the line assembly plus the at least one outlet nozzle by a clamping system, which is carried directly or indirectly by the first linear axis or by an additional axis.

The receiving of the tool and the receiving of the line assembly occur simultaneously, because the non-productive times can thus be reduced in the best possible way. Furthermore, the simultaneous receiving allows constellations in which the line assembly partly surrounds the tool.

An automated clamping process is carried out within the scope of at least some embodiments of the method of the invention in order to clamp the tool to the tool spindle. Furthermore, a further automated clamping process is carried out in order to clamp the line assembly by means of the clamping system.

An electromechanical, electromagnetic, hydraulic and/or pneumatic actuating apparatus of the apparatus is actuated in at least some embodiments during the automated clamping of the line assembly.

In at least some embodiments, a tool spindle or a housing of the apparatus are pivoted to a transfer position for providing the tool and the line assembly in such a way that a surface is disposed in a horizontal position, wherein the tool and the line assembly are made available adjacent to each other on said surface. In this manner, the tool and the line assembly can be triggered, received and automatically clamped simultaneously or successively by the movement of the first linear axis and/or the additional axis.

In at least some embodiments, a machining apparatus for machining a workpiece with a tool, comprises: a tool axis about which a tool is rotatably drivable, and a fluid feed apparatus including a line assembly and at least one outlet nozzle, and configured to emit a fluid under pressure through the at least one outlet nozzle in a direction of a tool when mounted on the machining apparatus, wherein the line assembly is configured to jointly follow movements of said tool together with the at least one outlet nozzle in order to remain in a relative spatial reference to said tool, wherein the fluid feed apparatus comprises a clamping system which comprises a coupling region, and which is configured to one or more of (1) automatically clamp the line assembly on the machining apparatus or (2) automatically disconnect the line assembly from the machining apparatus, wherein the machining apparatus further comprises an actuating apparatus that is one more of electromechanical, electromagnetic, hydraulic or pneumatic and configured to one or more of (a) automatically disconnect the line assembly from the machining apparatus in the coupling region or (b) automatically clamp the line assembly to the machining apparatus in the coupling region.

In at least some embodiments, a method for setting up a machining apparatus for machining a workpiece with a tool comprises the following steps: transferring a first linear axis of the machining apparatus to a changing position by moving at least one axis of the machining apparatus, mounting a tool to a tool spindle of the machining apparatus which is movable in a direction of the first linear axis, and connecting a line assembly including at least one outlet nozzle to the machining apparatus using a clamping system of the machining apparatus which is movable in a direction of the first linear axis or an additional axis, wherein the steps of mounting the tool and connecting the line assembly are performed successively or simultaneously.

Other objects and advantages of the invention should be apparent from the drawings and detailed description herein. It should be understood, however, that any such objects and/or advantages are not required in all aspects and embodiments.

DRAWINGS

The drawings are described in a coherent and collective manner. Exemplary embodiments of the invention are described below in closer detail by reference to the drawings.

DETAILED DESCRIPTION

Terms are used in conjunction with the present description which are also used in relevant publications and patents. However, it is to be noted that the use of these terms is only to serve for better comprehension. The concepts are not to be restricted in interpretation by the specific selection of the terms. At least some embodiments of the invention may be readily transferred to other term systems and/or technical fields. The terms are to be applied accordingly in other technical fields.

Apparatuses 100 are concerned in this case, which are also known as machine tools. These apparatuses 100 are especially designed for machining metal workpieces 30 such as gearwheels, shafts, coupling parts and the like. A workpiece 30 is a component to be machined.

Apparatuses 100 in at least some embodiments are formed for machining by grinding such metal workpieces 30, wherein said apparatuses 100 can be fitted with a grinding tool 20. The grinding tools 20 are generally referred to herein as tools 20. The application of at least some embodiments of the invention is in gear grinding machines 100, wherein a cup grinding wheel or dish grinding wheel is used in this machine 100 as a tool 20.

The term line assembly 53 can comprise both rigid as well as elastic lines, which are capable of conducting a fluid under pressure. Rigid line assemblies 53 are used in at least some embodiments because they can be aligned more precisely and are more robust.

A closed or open ring line is used in at least some embodiments as a line assembly 53. The drawings show open ring lines as line assemblies 53, which have a C-, U- or L-shape in a top view (see FIG. 3G for example).

The ring line can also be closed in at least some embodiments however in order to completely surround the tool 20. Such constellations are known as closed ring lines. Some embodiments of the invention allow the use of closed ring lines which completely surround the tool 20, because the tool 20 and the line assembly 53 are accommodated and then clamped simultaneously during the setup of the apparatus 100.

A cooling oil and/or lubricating oil is used as a fluid in at least some embodiments.

A process is known as automated clamping which is (usually) carried out in the apparatus 100 without manual intervention. During clamping, a part 69 of a clamping system 40 of the fluid feed apparatus 50 is connected in a pressure-tight manner to another part 72 of the clamping system 40.

The automated clamping is carried out in at least some embodiments after the closing of the housing or a protective region of the apparatus 100.

A process is designated as automated disconnection which is (usually) carried out in the apparatus 100 without manual intervention. During disconnection, a part 69 of the clamping system 40 is disconnected from another part 72 of the clamping apparatus. The automated disconnection is also carried out when the housing or the protective region of the apparatus 100 is closed. The housing or the protective region is typically only opened after the disconnection.

Figure 1:
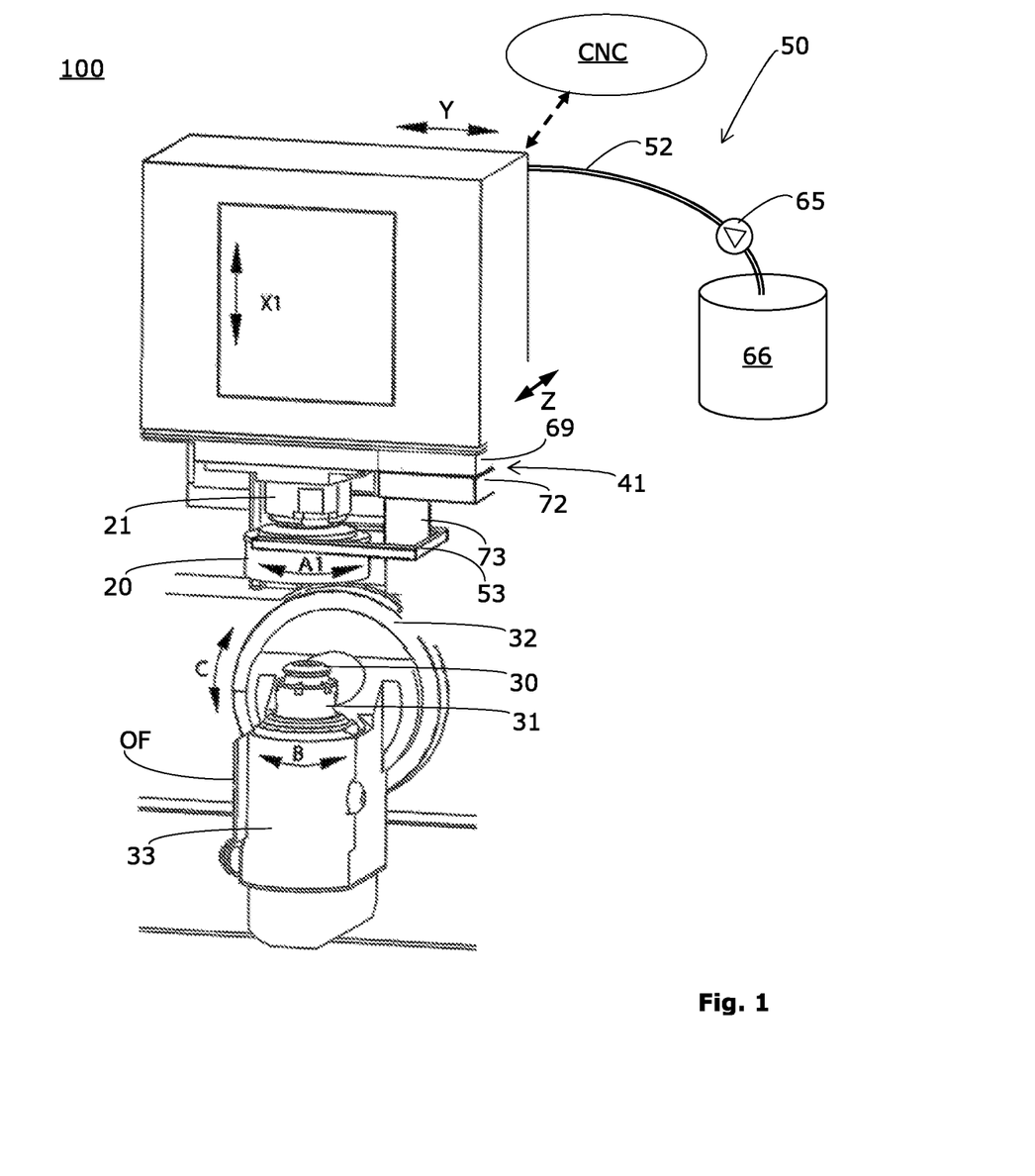
FIG. 1 shows a perspective view of a first exemplary multi-axis grinding machine with a fluid feed apparatus in a first embodiment.

FIG. 1 shows a perspective view of a first exemplary multi-axis apparatus 100 (a grinding machine in this case), which is fitted with a fluid feed apparatus 50 in a first embodiment.

In at least some embodiments, the apparatus 100 concerns a CNC-controlled grinding machine, which comprises several numerically controllable axes A1, B, C, X1 and Y. The apparatus 100 typically further comprises a third linear axis which is known as the Z-axis.

In the case of the embodiment shown in FIG. 1, the apparatus 100 comprises the following, numerically controllable axes:

A1-axis: tool axis which is arranged here in a vertically suspended manner, wherein the A1-axis comprises a tool spindle 21 which can be fitted with a grinding tool 20. FIG. 1 shows a grinding cup as a tool 20. The tool 20 is rotatably driveable by means of a drive of the tool spindle 21 about the A1 axis.

B-axis: tool axis which is arranged here in a vertically upright manner, wherein the B-axis comprises a tool spindle 31 which can be fitted with a workpiece 30. The workpiece 30 is rotatably driveable about the B-axis by means of a drive of the workpiece spindle 31. The aforementioned drive can be arranged in a housing 33 for example.

C-axis: the C-axis concerns a pivot axis, which stands perpendicularly to the B-axis in this case. The apparatus 100 comprises a pivot plate 32 and a pivot drive. The pivot drive allows pivoting the pivot plate 32 about the C-axis. The pivot plate 32 carries the housing 33, the workpiece spindle 31 and the workpiece 30 in this case. In at least some embodiments, the C-axis is formed in such a way that the workpiece spindle 31, and the housing 33 respectively, can be transferred to a changing position. In this changing position, the B-axis lies horizontally and a surface OF of the housing 33 of the workpiece spindle 31 is situated in a horizontal orientation. Further details in this respect will be explained below in closer detail.

Figure 2:
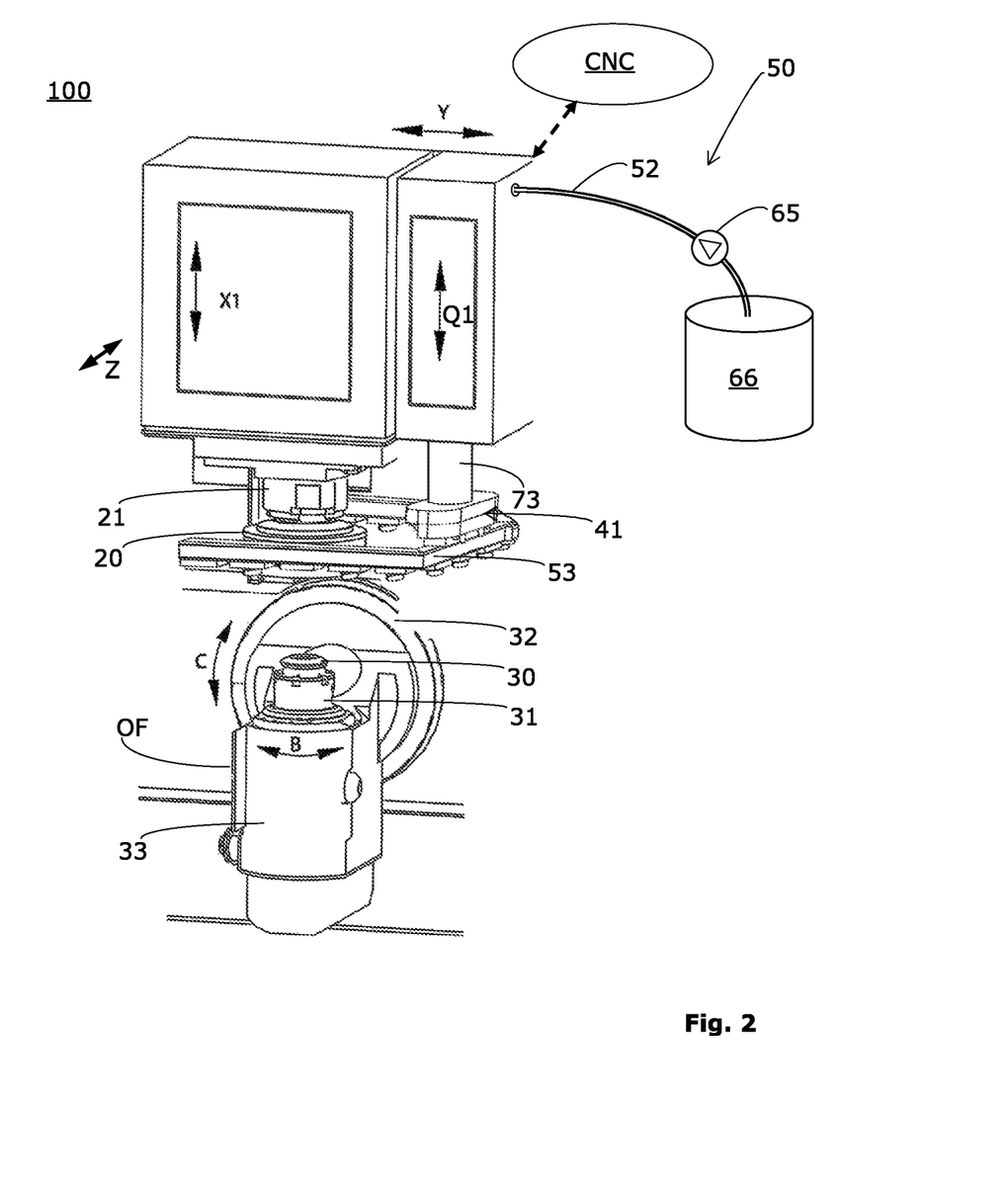
FIG. 2 shows a perspective view of a second exemplary multi-access grinding machine with a fluid feed apparatus in a second embodiment.

X1-axis: a linear axis (also known here as the first linear axis), which stands perpendicularly in space. The workpiece spindle 21 plus the grinding tool 20 is arranged in this case on said X1-axis. In the first embodiment which is shown in FIG. 1, the X1-axis also carries the fluid feed apparatus 50. The fluid feed apparatus 50 is thus arranged directly on the X1-axis. In the second embodiment which is shown in FIG. 2 there is a separate Q1-axis (also known as additional axis), which can be arranged for example parallel to the X1-axis. The Q1-axis carries the fluid feed apparatus 50 in this case. A third embodiment is also possible in which the X1-axis carries the Q1-axis plus the fluid feed apparatus 50. The fluid feed apparatus 50 is arranged in this case indirectly on the X1-axis.

Y-axis: a linear axis (also known here as the second linear axis), which is formed for horizontal displacement, as shown in FIG. 1.

Z-axis: a linear axis (also known here as the third linear axis), which is formed for horizontal displacement, as shown in FIG. 1.

Q1-axis (known as additional axis): an optional linear axis which can be used in at least some embodiments. This Q1-axis, if present, carries the fluid feed apparatus 50. The Q1-axis is used as an additional axis which carries the line assembly 53 plus the at least one outlet nozzle 51 in such a way that the line assembly 53 plus the outlet nozzle 51 can be displaced relative to the tool 20 in order to allow fine adjustment, readjustment or compensation for wear and tear. The Q1-axis allows a relative displacement of the position of the line assembly 53 in relation to the tool 20 in at least some embodiments, wherein said relative displacement occurs in at least some embodiments parallel to the direction of the A1-axis. Compensation for wear and tear can be carried out by the relative adjustment for example, once the tool 20 has been trimmed by a dressing process. The height of a grinding cup is slightly reduced within the scope of a dressing process for example. The position of the line assembly 53 in relation to the tool 20 can be adjusted to the changed height by using the Q1-axis.

FIGS. 1 and 2 only show a number of parts of the fluid feed apparatuses 50.

In at least some embodiments, a fluid feed apparatus 50 comprises a fluid tank 66 and a pump 65, for example in order to allow the conveyance of a fluid under pressure into the line assembly 53. The section of the fluid feed apparatus 50 which lies between the pump 65 and the line assembly 53 is also known as the pressure side of the fluid feed apparatus 50. These elements of the fluid feed apparatus 50 are only schematically indicated in FIGS. 1 and 2, because there are numerous possibilities in this case to enable the conveyance of a fluid under pressure into the line assembly 53.

The fluid feed apparatus 50 of at least some embodiments of the invention may comprise a clamping region 40 (see FIG. 3A), which is formed for the automated clamping of the line assembly 53 and/or for the automated disconnection of the line assembly 53.

For this purpose, the clamping region 40 comprises a coupling region 41, as shown in FIGS. 1, 2 as well as 3A to 3G on the basis of different embodiments. A first surface 42 is provided in the coupling region 41, which first surface is associated with the apparatus 100. In FIGS. 3B and 3C, said first surface 42 faces downwardly. The first surface 42 is shown in FIG. 3E.

A second surface 43, which is associated with the line assembly 53, is provided in the coupling region 41. FIG. 3C shows said second surface 43 in the upward direction. In FIG. 3G said second surface 43 lies at the top.

The first surface 42 and the second surface 43 are formed in at least some embodiments as complementary surfaces which fit in a flush manner on each other in the mounted state. Two flat surfaces 42 and 43 are used in at least some embodiments, as shown in the drawings. However, the surfaces 42, 43 can also have a different shape in at least some embodiments (e.g. a curved shape).

A fluid coupling 61, 84 is provided in the coupling region 41 in at least some embodiments, which fluid coupling is formed to provide a pressure-tight fluid connection between the pressure side of the fluid feed apparatus 50 and the line assembly 53 plus the at least one outlet nozzle 51 after the automated clamping.

The fluid coupling 61, 84 can comprise for example an outlet opening 71 in the region of the first surface 42 and an inlet opening 68 in the region of the second surface 43. The outlet opening 71 is in fluid connection with the pressure side of the fluid feed apparatus 50 (e.g. via a fluid line 74) and the inlet opening 68 is in fluid connection with the line assembly 53.

The clamping system 40 is formed in such a way that the inlet opening 68 and the outlet opening 71 are aligned optimally with respect to each other. At least one O-shaped sealing ring 84 (see FIG. 3C) is used in at least some embodiments in the transitional region between the outlet opening 71 and the inlet opening 68 in order to enable a pressure-tight fluid connection.

In addition to the means which enable a pressure-tight fluid connection (which are designated here as a fluid coupling 61, 85), in at least some embodiments, the apparatus 100 comprises at least one mechanical coupling apparatus in the coupling region 41. Said coupling apparatus comprises a first coupling element 64 on the side of the line assembly 53 and a second coupling element 63 on the apparatus side, wherein the first coupling element 64 and the second coupling element 63 can be formed in a complementary manner with respect to each other.

In FIGS. 3A to 3G, this principle of the coupling elements 63 and 64, which engage in a complementary manner into each other, is shown by reference to an example. Two first coupling elements 64 can be recognised in FIGS. 3C and 3F. FIG. 3C shows these first coupling elements 64 separately from each other. It can be recognised in FIG. 3F that said coupling elements 64 each can be mounted in a respective opening 86 of the second surface 43. The two first coupling elements 64 can be anchored in a fixed manner in the first surface 42 (e.g. bolted or fixed with setscrews). The two openings 86 are clearly shown in FIG. 3G.

FIG. 3E shows that two receiving openings in the surface 42 can be used as second coupling elements 63.

The two first coupling elements 64 can have a substantially cylindrical shape for example, e.g. like a clamping nipple. The openings 63 are provided with the shape of a clamping cup in this case.

Coupling elements (e.g. the coupling elements 64) are used in at least some embodiments, which coupling elements are formed to engage in coupling elements (e.g. openings/coupling elements 63) which are formed in a complementary manner.

Further details of the clamping system 40 are described by reference to FIG. 3D. As already mentioned above, the clamping system 40 can comprise a first surface 42 and a second surface 43 in the coupling region 41. In at least some embodiments, the first surface 42 is arranged on an upper block 69. Said upper block 69 is also known as Q1-receiver, because said block 69 is associated with the apparatus 100 or the Q1-axis respectively. FIG. 3D shows the upper block 69 from above. The first surface 42 is not visible because it faces downwardly into the plane of the drawing. The aforementioned passage opening 71, which is used to guide the fluid from the pump 65 through the upper block 69, can already be recognised in FIG. 3D.

Two pressure openings 72 are further shown, which are used to enable the clamping and/or disconnection by the application of a pressure. It is also possible to operate with only one pressure opening 72 in at least some embodiments.

The aforementioned pressure opening 72, or the two pressure openings 72, can be part of a hydraulic and/or pneumatic actuating apparatus, which allows automatically disconnecting the line assembly 53 in the coupling region 41 from the apparatus 100 and/or clamping the line assembly 53 automatically to the apparatus 100 in the coupling region 42.

Instead of a hydraulic and/or pneumatic actuating apparatus, an electromechanical and/or electromagnetic actuating apparatus can also be used in at least some embodiments.

In at least some embodiments, the upper block 69 is provided in the interior with pressure lines, which allow advancing actuators during the application of a pressure in such a way that male coupling elements for example (e.g. the first coupling elements 64), which are fastened in this case in the region of a lower block 72, are clamped temporarily in the upper block 69. The pressure lines in the interior of the upper block 69 are in pressure connection with the pressure opening 72 or the pressure openings 72.

Such actuators can be arranged in at least some embodiments in the upper block 69 and/or in the lower block 72 in such a way that they enter into interaction with one or several coupling elements 63, 64 in order to tightly clamp the bottom block 72 plus the line assembly 53 to the upper block 69, and/or to disconnect the bottom block 72 plus the line assembly 53 from the upper block 69.

In at least some embodiments, at least one of the coupling elements 63, 64 can also be fitted with an integrated actuator, which transfers to a clamping position during application of a pressure for example or which transfers to a disconnect position upon applying a pressure.

The fluid feed apparatus 50 can be fitted in at least some embodiments with at least one proximity sensor 83 (see FIG. 3B) which is arranged in the region of the upper block 69 in order to signal the approach of the bottom block 72 to the upper block 69 during the clamping process. Once the proximity sensor 83 emits a signal which signals the arrival of an end position of the bottom block 72 in relation to the upper block 69, a pressure can be applied to one or several actuators by the pressure lines in order to clamp the coupling element(s) 63, 64 and to tightly connect the two blocks 69, 72 to each other.

In at least some embodiments, the proximity sensor 83 can be seated in a passage hole 82 of the upper block 69 (see FIGS. 3D and 3E).

In at least some embodiments, no electrical elements are arranged in the region of the bottom block 72, the line assembly 53 and the outlet nozzle(s) 51. This offers the advantage that only the upper block 69 needs to be connected electrically to the apparatus 100.

In at least some embodiments, elements which can be actuated by pressure are arranged in the region of the bottom block 72, the line assembly 53 and the outlet nozzle(s) 51. This offers the advantage that only the upper block 69 needs to be connected with respect to pressure to the apparatus 100 in order to allow for example carrying out the clamping and/or disconnection automatically by using hydraulic and/or pneumatic actuating apparatuses.

In at least some embodiments, the bottom block 72 is used as the receiver or carrier of the line assembly 53, as shown in FIG. 2 as well as FIGS. 3A to 3G. An intermediate plate 67 can be arranged between the line assembly 53 and the bottom block 72, which intermediate plate can be formed as an adapter for example. The intermediate plate 67, if present, comprises at least one opening in order to allow conducting the fluid from the bottom block 72 into the line assembly 53.

The line assembly 53 can also be carried by a guide tube 73, as shown in FIG. 1.

The upper block 69 can be fastened for example in the region of the X1-axis in an embodiment according to FIG. 1. The bottom block 72 is connected in the coupling region 41 to the upper block 69. The guide tube 73 extends in this case from the bottom block 72 in the downward direction and carries the line assembly 53 at the bottom end, as shown in FIG. 1. The clamping and disconnecting occurs in this case in the coupling region 41, wherein the two blocks 69 and 72 can be fitted as mentioned above.

At least some embodiments comprise a cleaning apparatus, which can be integrated in the clamping system 40, as described below. The cleaning apparatus can be operated with the same fluid which is used for cooling and/or lubricating. A different fluid can be used as a cleaning agent in at least some embodiments however. In this case, a further tank with a pump is provided for example in order to allow pumping the cleaning agent through the clamping system 40 into the line assembly 53. The cleaning agent is emitted through the outlet nozzle(s) 51 in the region of the line assembly 53 in order to clean the line assembly 53, the nozzle(s) 51 and/or the tool 20. The cleaning apparatus can also be formed for backflushing.

FIG. 3B shows that both a fluid line 74 as well as a cleaning agent line 75 can be arranged in the interior of a guide tube 73. A passage opening 76 for conducting the cleaning agent into the line assembly 53 can be provided in the upper block 69. The passage opening 76 can be connected to a passage opening 87 during the connection of the upper block 69 with the bottom block 72 in order to conduct the cleaning agent into the line assembly 53.

At least some embodiments comprise at least one outlet nozzle 51 which can releasably be connected to the line assembly 53. In at least some embodiments, bolted and/or plug-in connections are used for the connection.

Figure 3A:
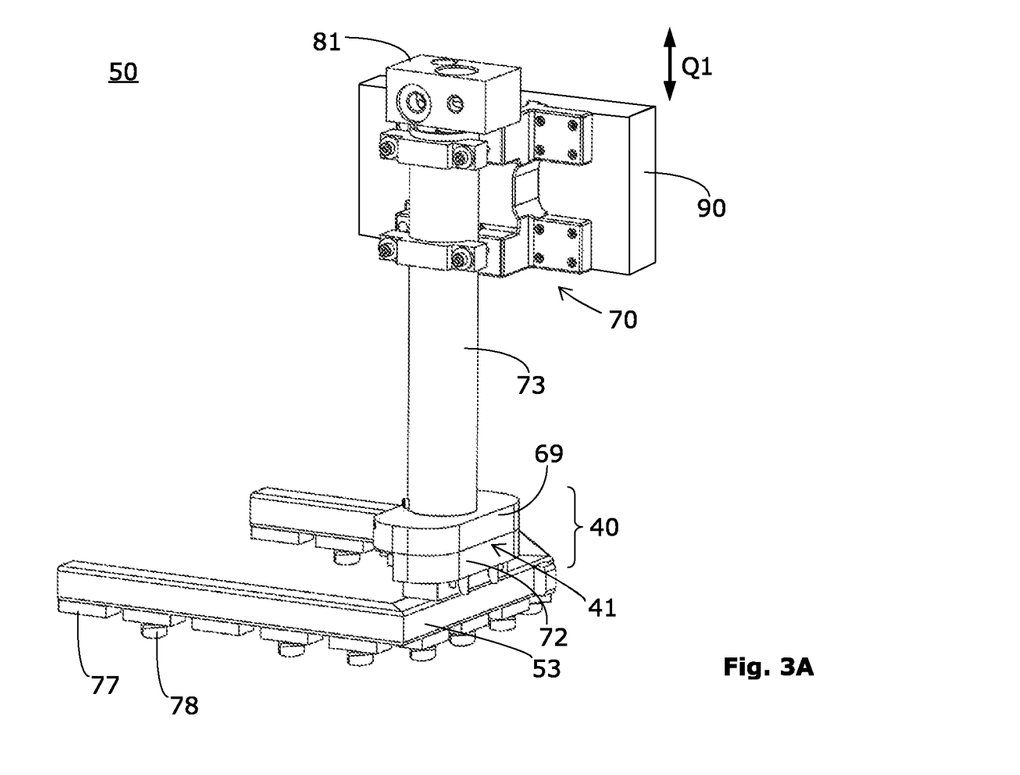
FIG. 3A shows a perspective view of a part of an embodiment of the fluid feed apparatus in an isolated view.
Figure 3B:
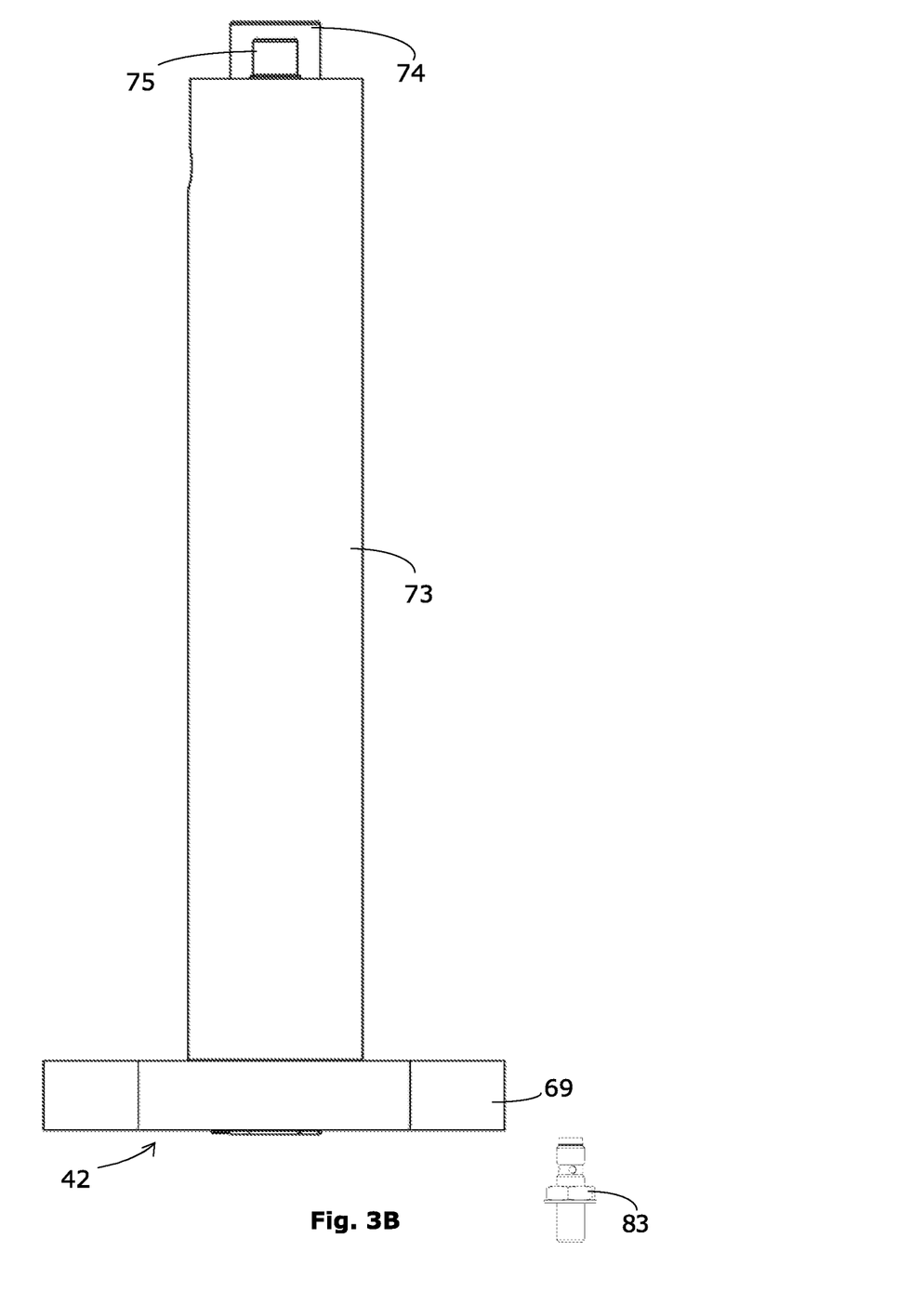
FIG. 3B shows a side view of an upper part of the fluid feed apparatus of FIG. 3A.
Figure 3C:
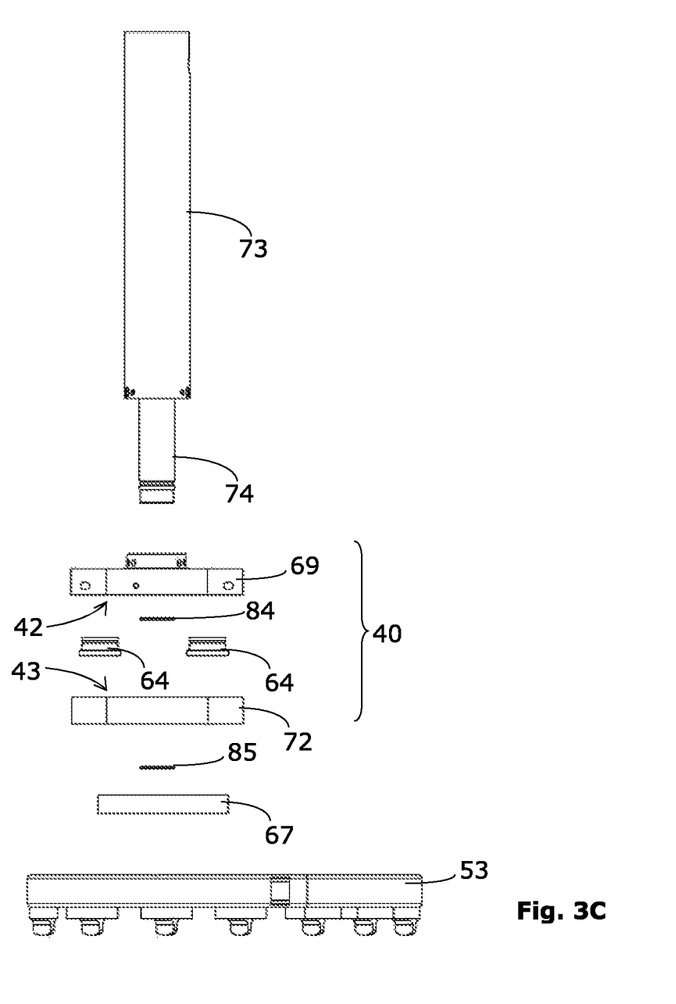
FIG. 3C shows an exploded view of a part of the fluid feed apparatus of FIG. 3A.
Figure 3D:
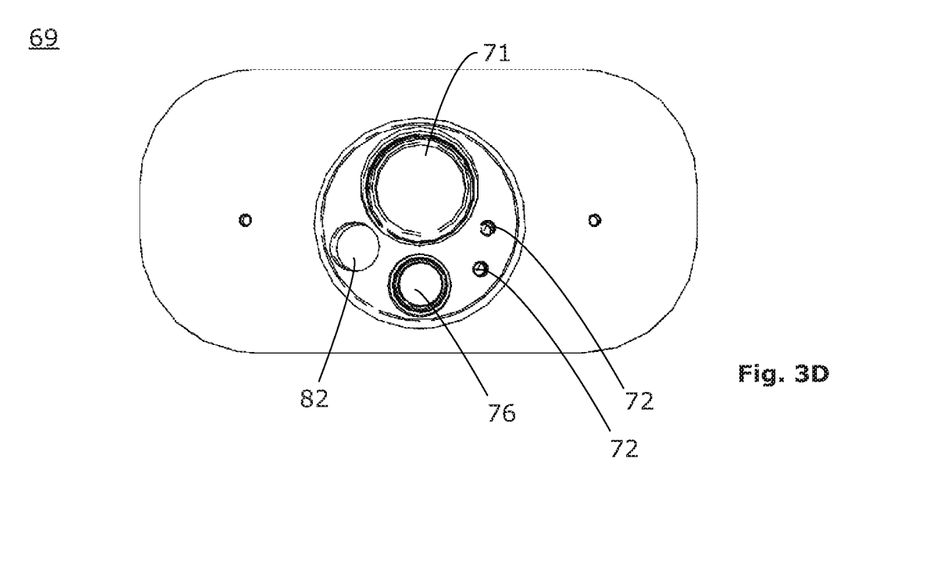
FIG. 3D shows a top view of an upper block of the fluid feed apparatus of FIG. 3A.
Figure 3E:
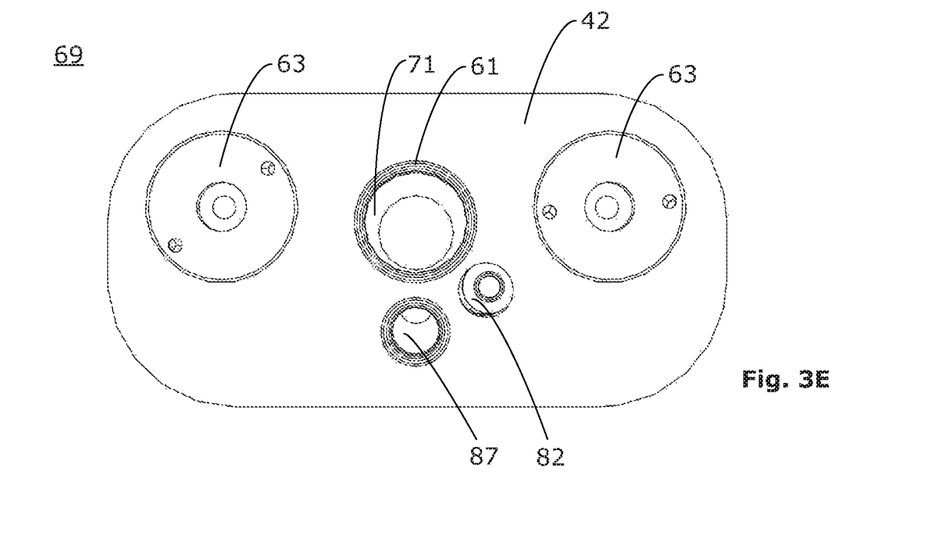
FIG. 3E shows a view of the upper block of the fluid feed apparatus of FIG. 3A from below.
Figure 3F:
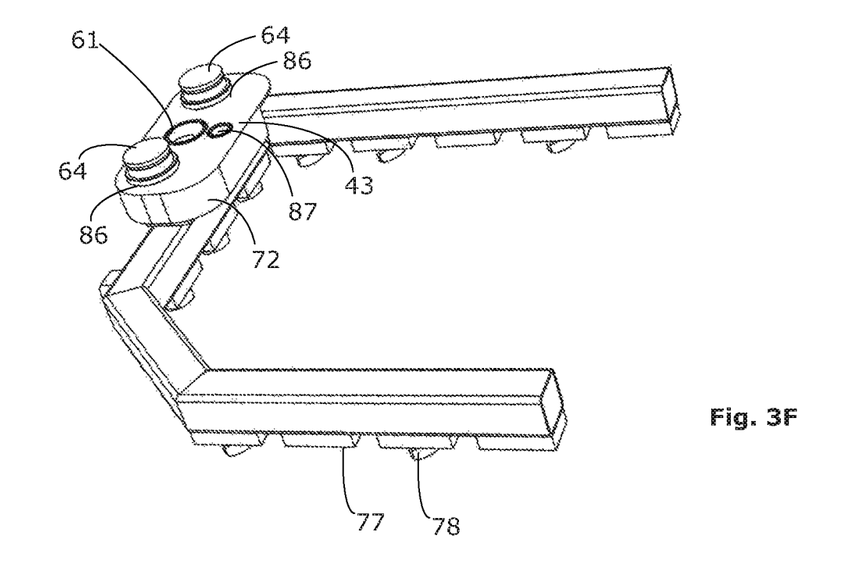
FIG. 3F shows a perspective view of a bottom block of the coupling region and the line assembly of the fluid feed apparatus of FIG. 3A.
Figure 3G:
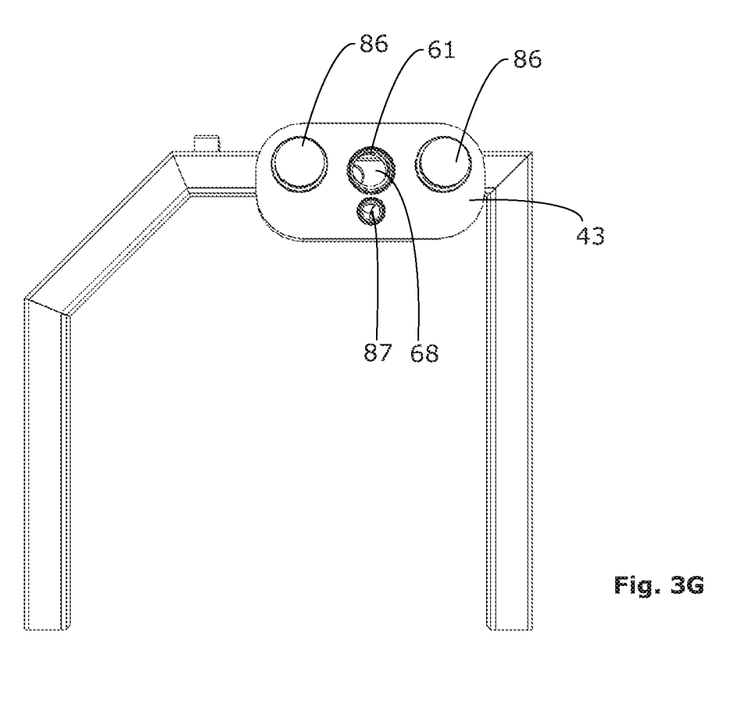
FIG. 3G shows a top view of the bottom block of the coupling region and the line assembly of the fluid feed apparatus of FIG. 3A.

FIGS. 3A to 3G show an embodiment of the line assembly 53, in which 14 docking points are provided altogether on the bottom side of the line assembly 53. A respective small rectangular receiving block 77 is mounted at each of these 14 docking points. FIG. 3A merely shows one of these receiving blocks with the reference numeral 77.

At least some embodiments comprise receiving blocks 77 which can be fitted with a blind cover 78, or on which an outlet nozzle 51 can be bolted and/or inserted. FIG. 3A only shows one of these blind covers which is provided with the reference numeral 78. No outlet nozzles 51 are shown in FIG. 3A in order to maintain clarity of the illustration.

Figure 4:
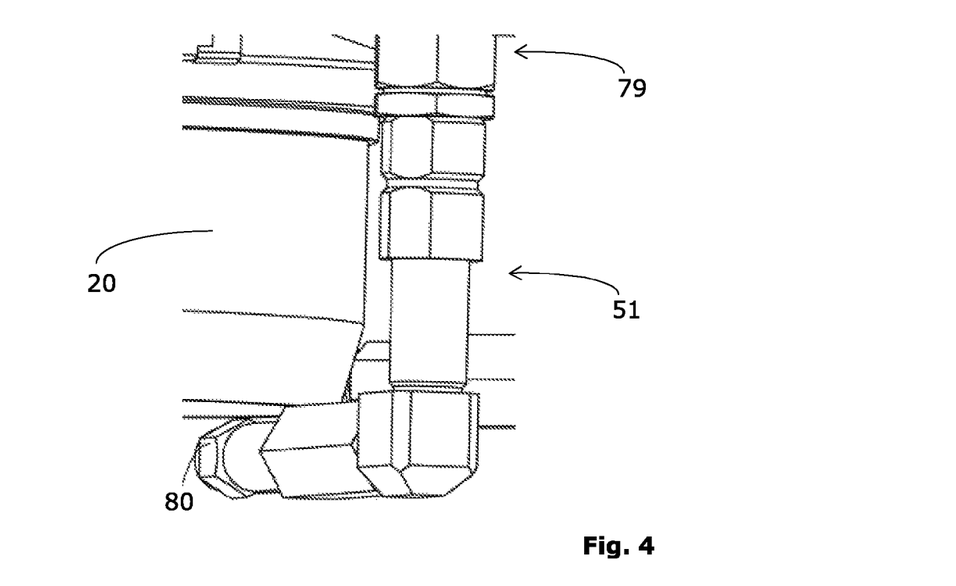
FIG. 4 shows a perspective view of an exemplary outlet nozzle in direct vicinity of a tool.

FIG. 4 shows a single outlet nozzle 51 as an example. The outlet nozzle 51 is seated in this case directly adjacent to a grinding cup used as tool 20.

In at least some embodiments, the outlet nozzle 51 can comprise a coupling region 79 (e.g. with a threaded sleeve), for example in order to enable the connection of the outlet nozzle 51 with the line assembly 53 (e.g. via receiving block 77, as mentioned above).

The outlet nozzle 51 can comprise a nozzle head 80 for example in at least some embodiments in order to allow spraying the fluid under high pressure in the direction of the tool 20. The illustrated outlet nozzle 51 is merely shown by way of example.

The aforementioned guide tube 73 can be connected in at least some embodiments to the Q1-axis, as shown in FIG. 2. Exemplary fastening means 70 are shown in FIG. 3A in order to allow flanging the guide tube 73 on a vertical carriage 90 of the Q1-axis for example. The vertical carriage 90 is shown in FIG. 3A in a purely schematic manner by means of a block.

At least some embodiments comprise a fluid block 81, which is shown in FIG. 3A above the guide tube 73. The fluid block 81 can be used for example for connecting the fluid line 52 and/or cooling agent and/or pressure lines and/or electrical lines.

Figure 5A:
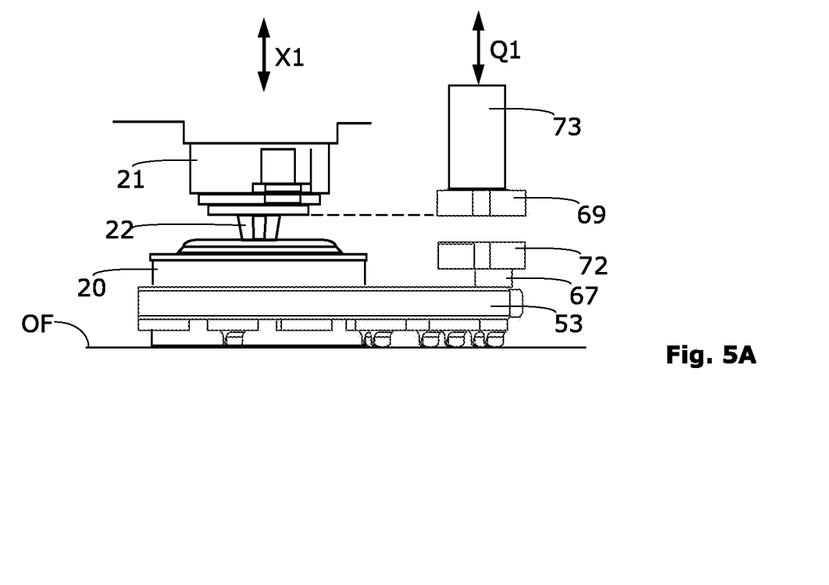
FIG. 5A shows a side view of a part of an exemplary apparatus of the invention prior to clamping the line assembly and the tool.

FIG. 5a shows a side view of a part of an apparatus 100 of an embodiment of the invention prior to the clamping of the line assembly 53 and the tool 20. The tool 20 and the line assembly 53 are situated at the illustrated point in time on a surface OF. The line assembly 53 is arranged in such a way that it surrounds the tool 20. The two axes X1 and Q1 are now moved downwardly in parallel in a coupled manner, if axes are concerned which are independent of each other. If the Q1-axis is carried by the X1-axis, then it is adequate if the X1-axis is moved downwardly because in this case the Q1-axis also jointly follows this movement. In the described downward movement, a clamping body 22 of the tool spindle 21 is inserted into a central clamping opening of the tool 20. In FIG. 5A, said clamping body 22 has already entered the clamping opening of the tool 20 to some extent.

The upper block 69 of the clamping system 40 approaches the bottom block 72 in parallel thereto.

Figure 5B:
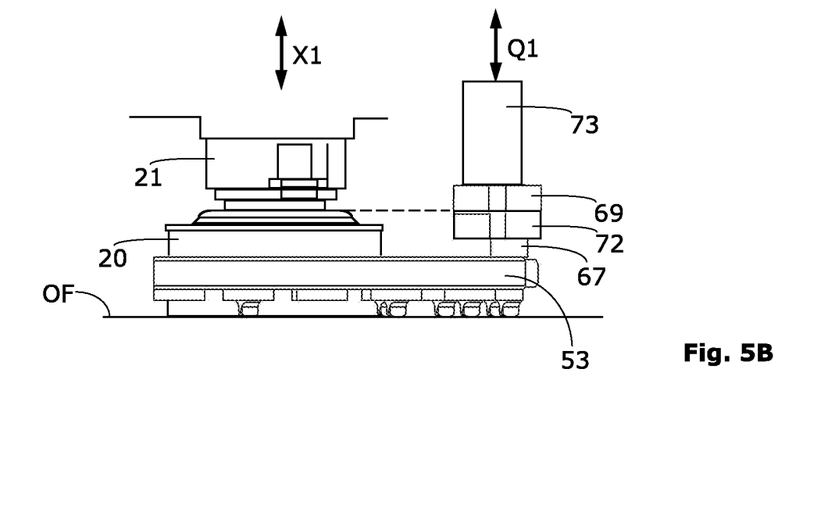
FIG. 5B shows a side view of a part of an exemplary apparatus of the invention during clamping of the line assembly and the tool.

FIG. 5B shows the end position. In this end position, which is also known as the clamping position, the clamping body 22 is immersed completely in the clamping opening of the tool 20, while the two blocks 69 and 72 lie surface 42 on surface 43. The automatic clamping of the tool 20 and the clamping system 40 can now be carried out.

The method for setting up the apparatus 100, which is formed for machining a workpiece 30 with a tool 20, comprises the following steps:

Providing the tool 20 in the region of the apparatus 100 (e.g. on a surface OF, as shown in FIG. 5A).

Providing a line assembly 53 in the region of the apparatus 100 which is fitted with at least one outlet nozzle 5, wherein the line assembly 53 can be provided on the same surface OF, as shown in FIG. 5A.

Transferring a first linear axis A1 of the apparatus 100 to a changing position by moving at least one axis (e.g. the A1-axis) of the apparatus 100. In this step, the Q1-axis can move in a coupled manner with the A1-axis, or the Q1-axis moves jointly with the A1-axis.

Simultaneous receiving of the tool 20 by a tool spindle 21 (e.g. by using a clamping body 20) which is carried by the first linear axis A1, and the line assembly 53 plus the at least one outlet nozzle 51 by the clamping system 40 which is carried directly or indirectly by the first linear axis A1, or which is carried by an additional axis Q1.

Once the end position (clamping position) has been reached, which is shown in FIG. 5B, an automated clamping process can be carried out in order to clamp the tool 20 onto the tool spindle 21. The clamping of a tool 20 in a machine 100 is generally known. An automated clamping process is carried out simultaneously or nearly simultaneously in order to clamp the line assembly 53 by means of the clamping system 40.

In this step of the automated clamping process, an electromechanical, electromagnetic, hydraulic and/or pneumatic actuating apparatus of the apparatus 100 can be actuated in order to connect the two blocks 69, 72 to each other.

For the purpose of providing the tool 20 and the line assembly 53, the tool spindle 31 or a housing 33 of the apparatus 100 for example can be pivoted to a transfer position in such a way that a surface OF is situated in a horizontal position.

As may be recognized by those of ordinary skill in the pertinent art based on the teachings herein, numerous changes and modifications may be made to the above described and other embodiments of the present invention without departing from the spirit of the invention as defined in the claims. Accordingly, this detailed description of embodiments is to be taken in an illustrative, as opposed to a limiting sense.

What is claimed is:

1. A machining apparatus for machining a workpiece with a tool, comprising:
    a tool axis about which a tool is rotatably drivable, and
    a fluid feed apparatus including a line assembly and at least one outlet nozzle connected to the line assembly, and configured to emit a fluid under pressure through the at least one outlet nozzle in a direction of a tool when mounted on the machining apparatus, wherein the line assembly is configured so that the line assembly and the at least one outlet nozzle follow movements of said tool and remain in a relative spatial reference to said tool,
    wherein the fluid feed apparatus comprises a clamping portion which comprises a coupling region, and which is configured for one or more of (1) automatically clamping the line assembly onto a part of the machining apparatus or (2) automatically disconnect the line assembly from said part of the machining apparatus, and
    wherein the machining apparatus further comprises an actuating apparatus that is one or more of electromechanical, electromagnetic, hydraulic or pneumatic and is configured for one or more of (a) automatically disconnecting the line assembly from said part of the machining apparatus in the coupling region or (b) automatically clamping the line assembly to said part of the machining apparatus in the coupling region.

2. A machining apparatus according to claim 1, further comprising a fluid coupling in the coupling region to form a pressure-tight fluid connection between a pressure side of the fluid feed apparatus and the line assembly.

3. A machining apparatus according to claim 1, further comprising at least one mechanical coupling apparatus in the coupling region, wherein said at least one mechanical coupling apparatus comprises a first coupling element on a side of said part of the machining apparatus and a second coupling element on a side of the line assembly, and wherein the first coupling element and the second coupling element are complimentarily configured with respect to each other so as to engage each other in a clamped state.

4. A machining apparatus according to claim 3, wherein the second coupling element comprises at least one clamping nipple and wherein the first coupling element comprises at least one clamping cup complimentarily configured to the clamping nipple.

5. A machining apparatus according to claim 1, further comprising a proximity sensor configured to supply a signal during relative movement of the line assembly and the at least one outlet nozzle signalling proximity of the line assembly and the at least one outlet nozzle.

6. A machining apparatus according to claim 1, further comprising a first linear axis, wherein the tool axis is located on the first linear axis, and an additional axis, wherein the line assembly and the at least one outlet nozzle are one or more of displaceable
    (a) relative to the tool to enable one or more of a fine adjustment, readjustment, or compensation for wear and tear, or
    (b) for said automatic clamping of the line assembly to said part of the machining apparatus in a direction of the additional axis.

7. A machining apparatus according to claim 6, wherein the additional axis is located on the first linear axis of the machining apparatus.

8. A machining apparatus according to claim 6, wherein the additional axis is located separately from the first linear axis on the machining apparatus to enable a movement of the line assembly and the at least one outlet nozzle independently of a movement of the first linear axis.

9. A machining apparatus according to claim 7, wherein the clamping portion further comprises a guide tube with an upper block configured to be coupled to a bottom block in the coupling region.

10. A machining apparatus according to claim 7, wherein the clamping portion further comprises a first surface in the coupling region and a second surface which is complimentarily configured with respect to the first surface, wherein the first surface is connected to the second surface in a clamped state.

11. A machining apparatus according to claim 7, wherein the clamping portion further comprises an outlet opening and an inlet opening in the coupling region, which in a clamped state lie on top of each other, and wherein the machining apparatus further comprises at least one sealing ring in the coupling region to form a pressure-tight connection of a pressure side of the fluid feed apparatus with the line assembly in the clamped state.

12. A method comprising:
- setting up a machining apparatus for machining a workpiece with a tool, wherein the machining apparatus includes
  - a tool axis about which a tool is rotatably drivable, and
  - a fluid feed apparatus including a line assembly and at least one outlet nozzle connected to the line assembly, and configured to emit a fluid under pressure through the at least one outlet nozzle in a direction of a tool when mounted on the machining apparatus,
  - wherein the line assembly is configured so that the line assembly and the at least one outlet nozzle follow movements of said tool and remain in a relative spatial reference to said tool,
  - wherein the fluid feed apparatus comprises a clamping portion which comprises a coupling region, and which is configured for one or more of (1) automatically clamping the line assembly onto a part of the machining apparatus or (2) automatically disconnect the line assembly from said part of the machining apparatus, and
  - wherein the machining apparatus further comprises an actuating apparatus that is one or more of electromechanical, electromagnetic, hydraulic or pneumatic, and is configured for one or more of (a) automatically disconnecting the line assembly from said part of the machining apparatus in the coupling region or (b) automatically clamping the line assembly to said part of the machining apparatus in the coupling region;

the setting up step comprising the following steps:
- transferring a first linear axis of the machining apparatus to a changing position by moving at least one axis of the machining apparatus,
- mounting a tool to a tool spindle of the machining apparatus which is movable in a direction of the first linear axis, and
- connecting the line assembly to said part of the machining apparatus using the clamping portion of the machining apparatus which is movable in a direction of the first linear axis or an additional axis,
- wherein the steps of mounting the tool and connecting the line assembly are performed successively or simultaneously.

13. A method according to claim 12, further comprising the following steps:
- a) performing an automated clamping process to clamp the tool onto the tool spindle, and
- b) with the clamping portion, performing an automated clamping process to clamp the line assembly to said part of the machining apparatus.

14. A method according to claim 13, wherein step b) includes actuating the actuating apparatus of the machining apparatus that is one or more of electromechanical, electromagnetic, hydraulic or pneumatic.

15. A method according to claim 12, further comprising the following steps:
- prior to the steps of mounting the tool and connecting the line assembly, pivoting the tool spindle or a housing of the machining apparatus to a transfer position wherein a surface of the machining apparatus is in a horizontal position, and
- positioning the tool and the line assembly on said surface adjacent to each other.

* * * * *